(12) United States Patent
Muttik et al.

(10) Patent No.: US 6,836,860 B2
(45) Date of Patent: Dec. 28, 2004

(54) DATA SCANNING FOR UPDATABLE PREDEFINED PROPERTIES

(75) Inventors: Igor Muttik, Berkhamsted (GB); Daniel Joseph Wolff, Aylesbury (GB); Lee Codel Lawson Tarbotton, Leicester (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 680 days.

(21) Appl. No.: 09/944,387

(22) Filed: Sep. 4, 2001

(65) Prior Publication Data

US 2003/0046611 A1 Mar. 6, 2003

(51) Int. Cl.⁷ .............................................. G06F 11/00
(52) U.S. Cl. ..................... 714/38; 713/200; 713/201; 717/168; 717/171
(58) Field of Search ..................... 714/38; 713/200, 713/201; 717/168, 171

(56) References Cited

U.S. PATENT DOCUMENTS

| | | | |
|---|---|---|---|
| 6,298,445 B1 * | 10/2001 | Shostack et al. | 713/201 |
| 6,343,300 B1 * | 1/2002 | Suetake | 707/203 |
| 6,757,830 B1 * | 6/2004 | Tarbotton et al. | 713/188 |
| 6,772,346 B1 * | 8/2004 | Chess et al. | 713/201 |
| 6,785,821 B1 * | 8/2004 | Teal | 713/200 |
| 2002/0042886 A1 * | 4/2002 | Lahti et al. | 713/201 |
| 2002/0199116 A1 * | 12/2002 | Hoene et al. | 713/201 |

* cited by examiner

Primary Examiner—Robert Beausoliel
Assistant Examiner—Marc M Duncan
(74) Attorney, Agent, or Firm—Nixon & Vanderhye P.C.; Christopher J. Hamaty

(57) ABSTRACT

A scan of computer files for predefined properties indicative of such things as viruses is disclosed. The scan is performed in a circular manner, such that when all of the files to be scanned have been scanned it starts again from the first file. The ability to update the data defining the properties to be scanned for during a scan is provided.

33 Claims, 5 Drawing Sheets

DATA SCANNING FOR UPDATABLE PREDEFINED PROPERTIES

BACKGROUND OF THE INVENTION

1. Field of the Invention

This invention relates to the field of data processing systems. More particularly, this invention relates to data processing systems in which it is desired to scan a plurality of computer files to identify one or more predetermined characteristics indicative of a computer file having some predefined properties.

2. Description of the Prior Art

It is known to provide anti-virus computer programs and E-mail and data filtering programs. Anti-virus programs may operate in an on-access mode or an on-demand mode. The on-access mode initiates a scan of a file when an access request to that file is made. The on-demand mode initiates a scan of all files on a specified volume or volumes either on a user request or on a scheduled request.

An anti-virus scan of a file consists of scanning that file for computer viruses, worms, Trojans or other undesired content. This is done by comparing the file with a library of data that defines content to be detected.

In a similar manner, content filtering programs scan files and incoming or outgoing messages for undesired content. This may happen when the messages are flowing in or out, or alternatively, it may take place in an on-demand way. That is to say, a scan of a complete volume of data or messages is initiated by a user or as a scheduled event.

A problem found with on-demand scans is the ever increasing time needed to perform this scan. This is due to an increasing amount of data to be scanned along with a growing number of computer viruses and other undesired forms of content for which it is desired to scan. In general an on-demand scan is performed at slack times, such as during the night or at a weekend, to avoid overloading of the server. However, given the increasing time required for these scans, the situation can arise when these periods of time are not sufficient to allow an on-demand scan to be run. This can result in such scans being terminated early which decreases the security and usefulness of such systems.

A further problem that may arise due to the length of time required to scan all the files on a particular system is that new viruses, for example, may be discovered mid-way through a long scan. Thus, new data defining the properties to be scanned for is available mid-way through the scan but is not used, so that the latter part of the scan is not as complete as it could be, there being data available that is not scanned for.

SUMMARY OF THE INVENTION

Viewed from one aspect the present invention provides, a computer program product comprising a computer program operable to control a computer to scan a plurality of computer files for predefined properties, said computer program comprising: computer file request logic operable to control said computer to issue computer file requests for computer files to be scanned; scanning logic operable to control said computer to scan said requested computer files for predefined properties in dependence upon property defining data defining said predefined properties; update checking logic operable to control said computer to periodically check for an update request to update said property defining data; update applying logic operable to control said computer to stop said computer file requests and to update said property defining data in response to said update request, and, on completion of said update, to resume operation of said computer file request logic such that subsequently requested files are scanned against said updated property defining data; wherein, when all of said plurality of computer files have been requested, said computer file request logic is operable to request a first computer file again.

The present invention addresses the problem of the storage of ever increasing amounts of data leading to scans taking longer and longer. It does this by scanning the files in a circular manner such that when all files have been scanned the scanner automatically starts the process again at the first file. Any new files created during a scan will therefore take their place with the other files in the list of files to be scanned and, given the circular nature of the scan, will themselves in time be scanned.

Additionally, if, for example a new virus is discovered mid-way through a scan, the present computer program product comprises updating facilities enabling the scan to be stopped while the data file containing property defining data is updated, the scan is then resumed at the next computer data file and all subsequently scanned files use the updated information. This means that any new property defining data that is available mid-way through a scan can be added to the property defining data mid-scan so that the latter part of the files are scanned for this data too. Furthermore, as when a scan has completed it automatically starts scanning from the beginning again, a scan of the early files including this new data will start immediately the present scan of all the files has completed.

The update checking logic checks for an update periodically, thus in some embodiments it checks after every file, while in others it does so after a certain number of files, or after a set period of time. This period of time may be constant throughout the scan or may vary depending on, say, time of day, or number of files already scanned. The period of time may be a set value written into the computer logic or it may be a value that is input by a user.

In some embodiments, the computer files scanned are those stored on a particular drive or in a particular directory although preferably all of the computer files stored on the computer are scanned.

In some embodiments, said computer program comprises at least one priority code, said priority code determining an amount of said computer's resources to be allocated to said computer program. Preferably, said at least one priority code is time dependent and comprises a high priority code during non-working periods and a low or zero priority code during normal working time. Thus, during working hours when the computer is being used for other things the scan is given a low priority and therefore, does not take up a lot, if any, of the processing time, whereas overnight, for example, when the computer is not being used for other tasks it has a high priority and can use a much greater proportion of the processing time to scan the files more quickly.

Although said computer file request logic can request files, non-sequentially or in parallel, in preferred embodiments said computer file request logic is operable to issue sequential computer file requests for computer files to be scanned.

In preferred embodiments said computer file request logic is operable, in response to an addition of computer files to said plurality of computer files, to issue a request for said newly added computer files. Thus, if new files are added to the system mid-scan these are placed at a high position in the queue so that they are scanned soon. This is important as any new file being added to a system carries a risk of virus infection with it.

Preferably, said computer program comprises storage logic, said storage logic being operable to control the computer to store computer file identifying data identifying said last requested computer file.

By storing data identifying the last requested computer file, this data can be accessed if the program is stopped for a length of time sufficient for the operating system to have forgotten which file was last sent.

Preferably, on resumption of operation of said computer program following a stoppage, said computer file request logic is operable to check said requested computer file against said stored computer file identifying data and if said requested computer file is not a computer file subsequent to a computer file identified by said stored computer file identify data to discard said computer file without implementing said scanning logic and to request a subsequent file.

The above helps ensure that scanning starts again at the point at which it was stopped, even in the case that the operating system has forgotten where it was. This helps produce an efficient use of scanning time, as all files are scanned in turn. Thus, if a scan is not completed in a particular downtime of the computer it can be restarted at that position at the start of the next downtime. This helps the scanning resources of the computer to be used efficiently. Furthermore, the process of checking each file against the computer file identifying data and not scanning it if it is not the desired file can be performed quickly, thus the scan can be restarted again without too much loss of time.

Advantageously, said computer program further comprises stop condition checking logic operable to control said computer to periodically check for a stop condition and to end said computer file scan on detection of said stop condition.

This enables the scanning program to be stopped, the stop condition may appear automatically in response to certain conditions, such as a certain loading of the computer, or it may be input by a user. Thus, if other work is to be done on the computer the scanning program may be stopped to avoid it taking up computer power required for other processes.

Further aspects of the present invention are set out in the appended claims.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
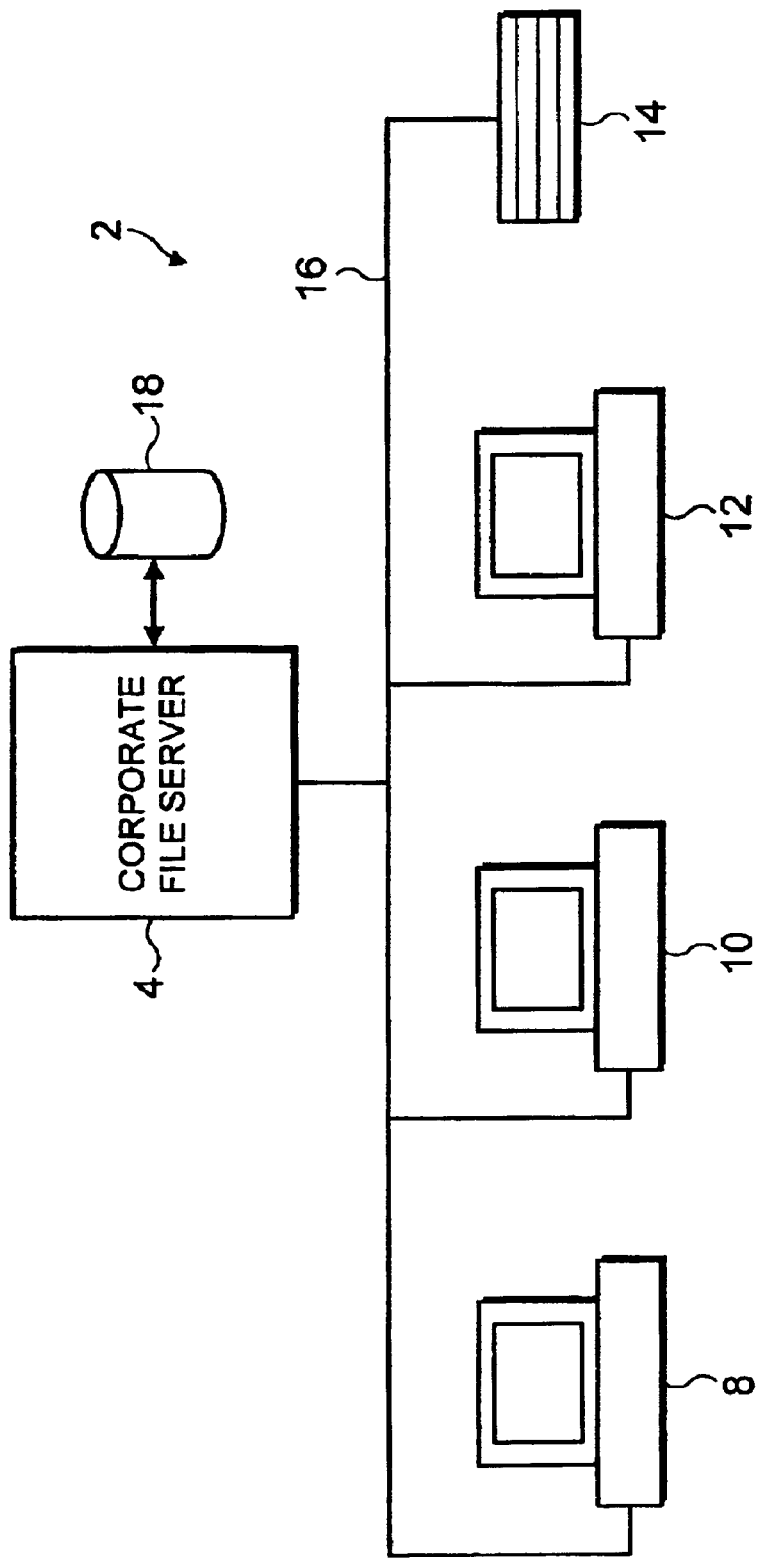
FIG. 1 schematically illustrates a computer network.

FIG. 1 illustrates a computer network 2 including a server 4, a plurality of client computers 8, 10, 12 and a plurality of rack mounted appliance computers 14. A local area network 16 connects these computers.

The server 4 includes a network storage device 18 providing file storage for the computers connected to the local area network 16.

In operation the network storage device 18 is subject to regular on-demand scans to identify computer viruses, Trojans, Worms and/or files with banned content. As the network storage device 18 can be very large, the amount of processing time required to compare every stored file against an increasing number of virus definition profiles can be extremely long. In general, the server 4 performs such scans during quiet times, such as overnight or during the weekend. Given the increasing length of time required for such scans, it may well be that it is not possible to complete these scans during the quiet times. This could result in incomplete scans which carry the risk of viruses going undetected.

Figure 2:
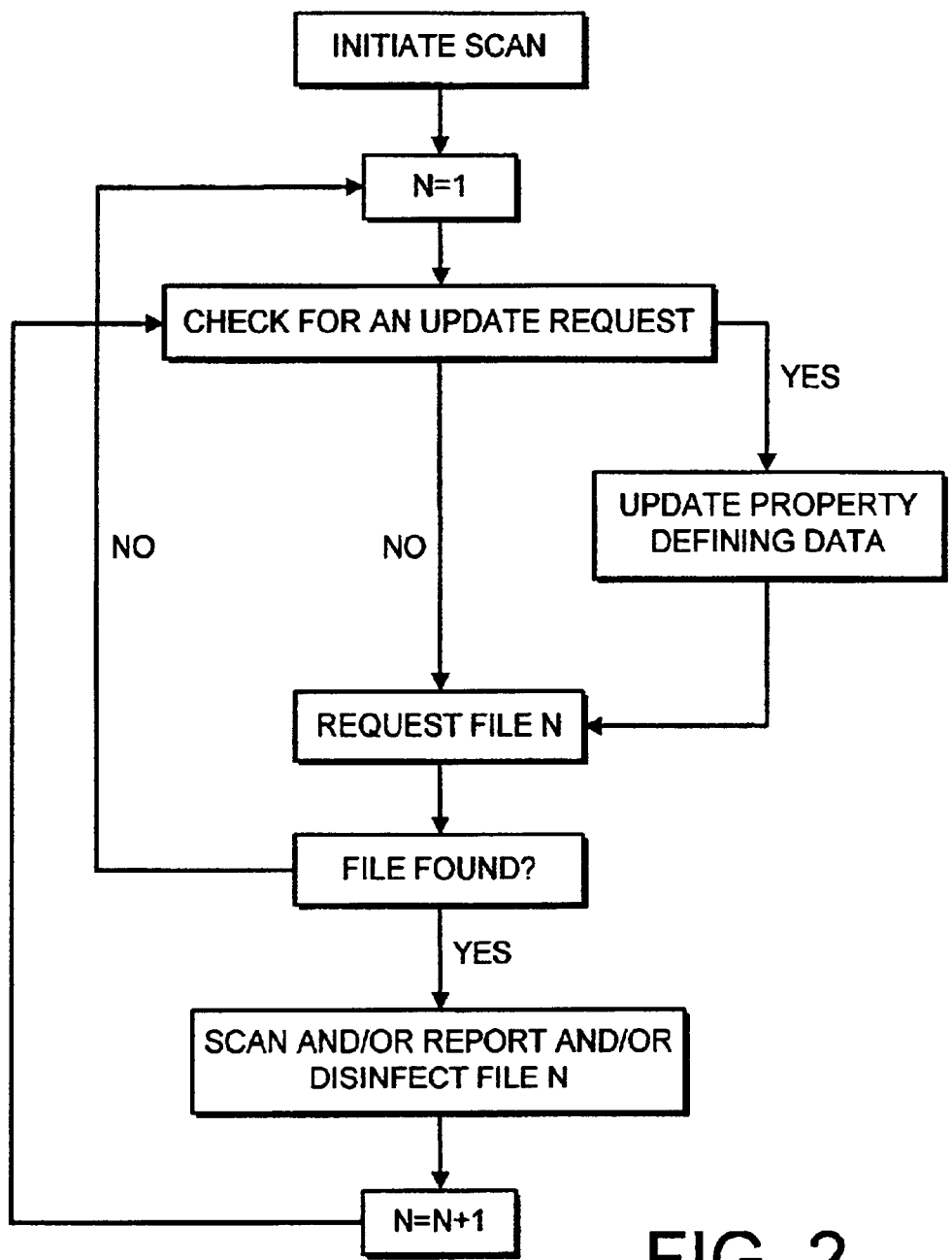
FIGS. 2 and 3 are flow diagrams schematically illustrating the circular aspect of embodiments of the scanning process.

FIG. 2 shows a flow diagram schematically illustrating the steps performed during a scan of computer files to detect files having predefined properties indicating specific content such as the presence of a computer virus. The scan is initialised either by a user request or it is triggered automatically by an event such as the computer being turned on. The program sets N to 1 and then checks for an update instruction, if no update instruction has been received, file N (the first file) is requested, and scanned. That is to say the contents of the file are checked for predefined properties that would suggest the presence of, for example, a virus against property defining data that has been compiled from known viruses. This data may be stored in a file on the computer.

Following scanning of this file, N is increased by 1 and then the computer checks again for an update instruction, if no instruction has been received the next file (N=2) is requested and scanned. This process is repeated until all the files to be scanned have been scanned. When this has been done the request for the next file does not find a file, this triggers the program to set N to one and then the process begins again.

If on checking for an update instruction, one is found, then the requesting and scanning of files is suspended and the property defining data is updated. When the update is complete the next file is requested and scanned against the updated data. N is then incremented in the standard way and the process begins again on the next file.

This means that if, for example, a new virus is discovered, the scan can be stopped using an update request signal. The property defining data can then be updated and the scan can be restarted at the point where it was stopped. Thus, all subsequently scanned files are scanned for the new virus in addition to the viruses already defined in the original property defining data.

If during the scan a file with a property being scanned for is detected, then the system may issue a warning to the user indicating this fact. Given the circular nature of the scan, it is clear that waiting until the scan has completed to issue a report on any file detected would not be effective. Thus, in this system, on detection of a file having a predetermined property indicative of say a virus, the computer will display to the user a warning that a virus may have been detected and a report on that virus will be produced. The user will then have the choice of disinfecting the file, and continuing with the scan. Alternatively, he may choose to stop the program then and there and turn off the computer awaiting expert help.

If new files are added to the system during the scan, these are placed in a high position in the queue, so that they are scanned soon. This is done by allocating a number such as N+1 or N+2 to the file, thereby ensuring that they are requested almost immediately. Any new files added to the system are a potential source of virus infection and as such an early scan is highly desirable.

Figure 3:
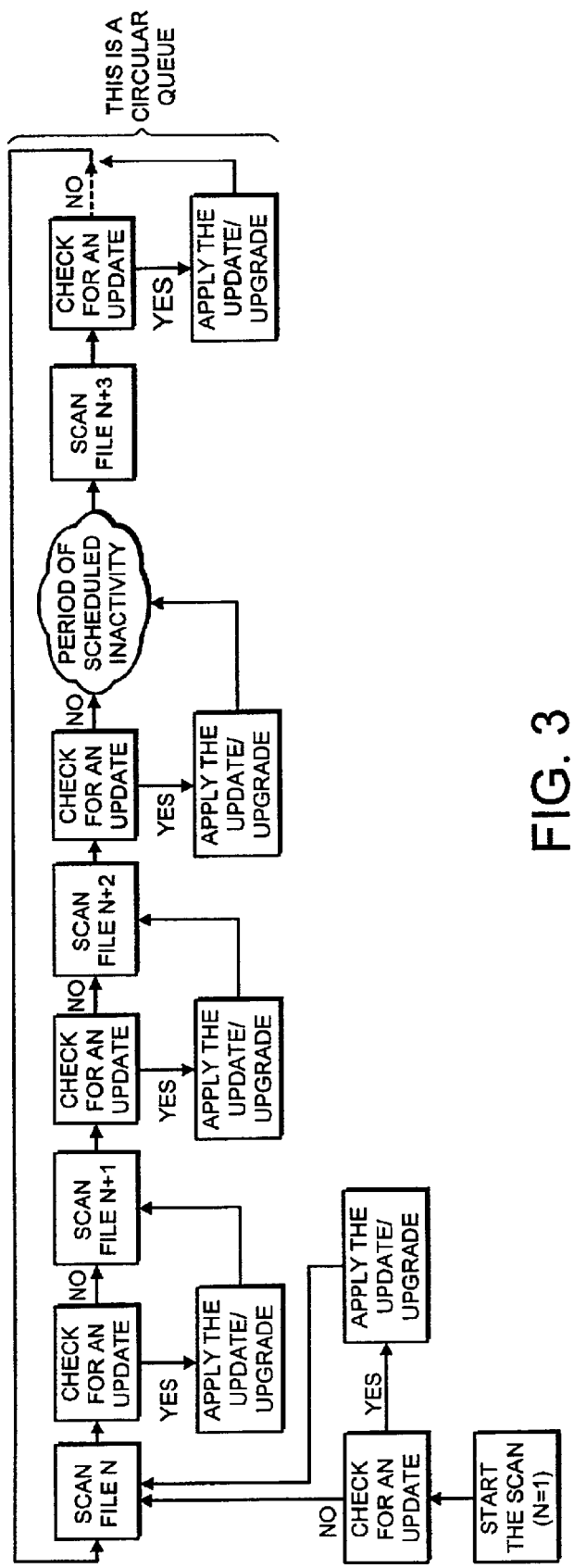

FIG. 3 shows a flow diagram schematically illustrating the steps performed during a scan according to an embodiment of the present invention. This figure includes a period of scheduled inactivity. A period of scheduled inactivity can occur during working time, for example, when the resources of a computer network are needed for other work and the scan is therefore suspended until a time when the computer resources are available again. The start of such a period could be marked by the priority code of the scanning program changing to zero, or it could be signalled by a user. The stopping of the scan by a user can be done in two ways. It can be done temporarily, such that when the scan is restarted it does so at the position at which it stopped, or it can be done in a more permanent way, so that when the scan is initialised again, it starts from the beginning of the scan at file N=1.

Figure 4:
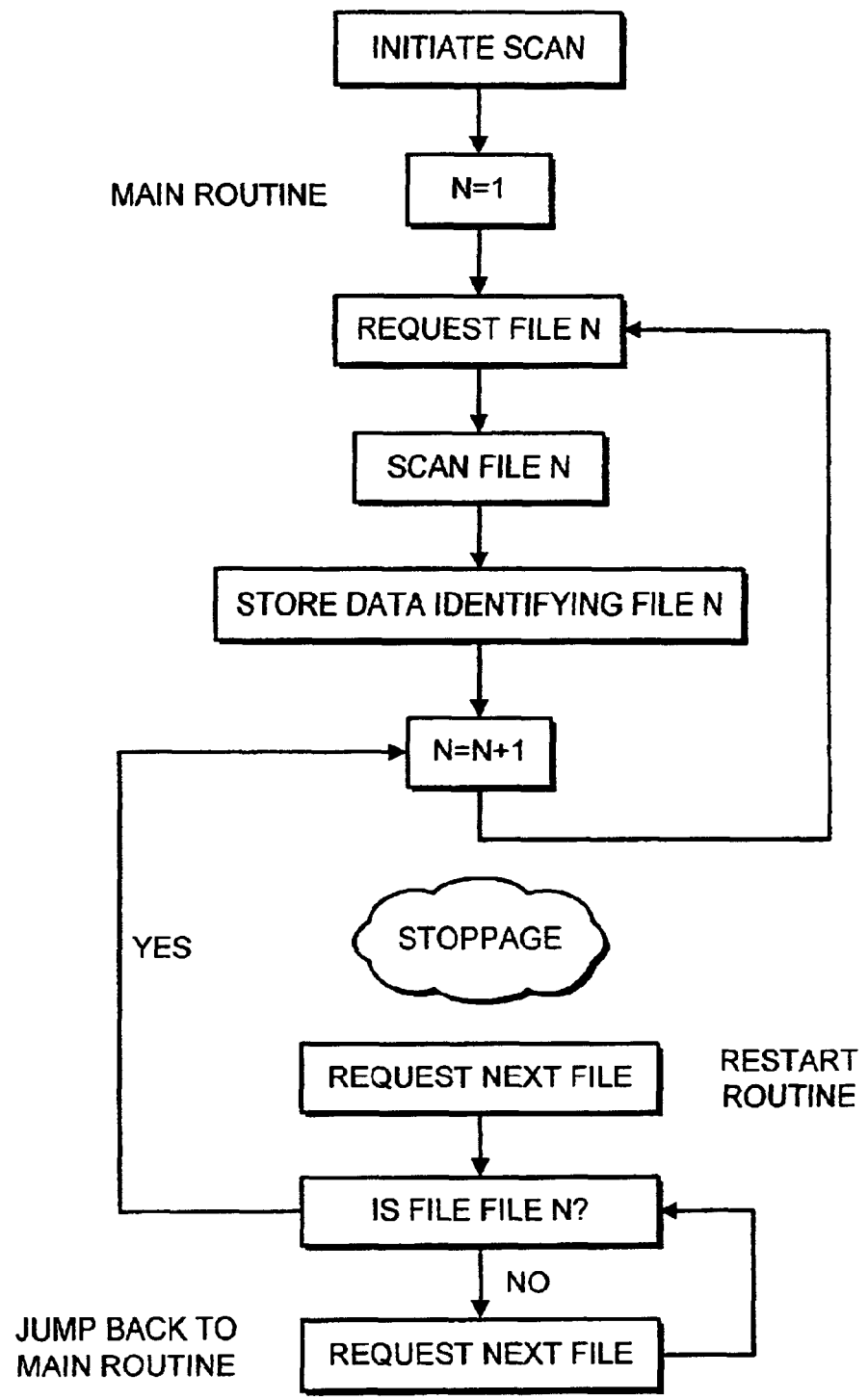
FIG. 4 is a flow diagram schematically illustrating an embodiment of the scanning process including a stoppage and resumption of the scan.

FIG. 4 shows this stopping of the procedure mid scan and its restarting at the point at which it was stopped in more detail. The part of the diagram below the stoppage is the restart routine and shows what happens on resumption of the program following a stoppage and how the main routine is accessed again at the point at which it was stopped.

The flow diagram shows how following initiation of a scan, either by user request or by a preset condition being fulfilled, N is set to one and file N (1) is requested. This file is then scanned and data identifying the file that has been scanned, schematically represented by N, is stored. N is then incremented and the next file N is requested.

If the program is stopped for some reason, then following resumption of the scan, a "next file" is requested from the operating system. This file can be checked against the stored data identifying the last file to be scanned, file N. If the file returned is not the file subsequent to file N, in this case file N+1 then the wrong file has been returned and this file is not scanned, it is discarded and the next file is requested. This process continues until a file corresponding to file N+1 is retrieved. This file is then scanned in the normal way and the process continues as before.

This addresses the problem that may occur in the case of a long stoppage when the operating system may not know which file it supplied last. In this case a request for a next file will result in the first file being sent. The identity of the file sent is quickly checked and rejected without being scanned if it is not file N+1, and the subsequent file is requested. This process is quick to perform and thus, the required file can be found quite quickly and the scan can start again.

Figure 5:
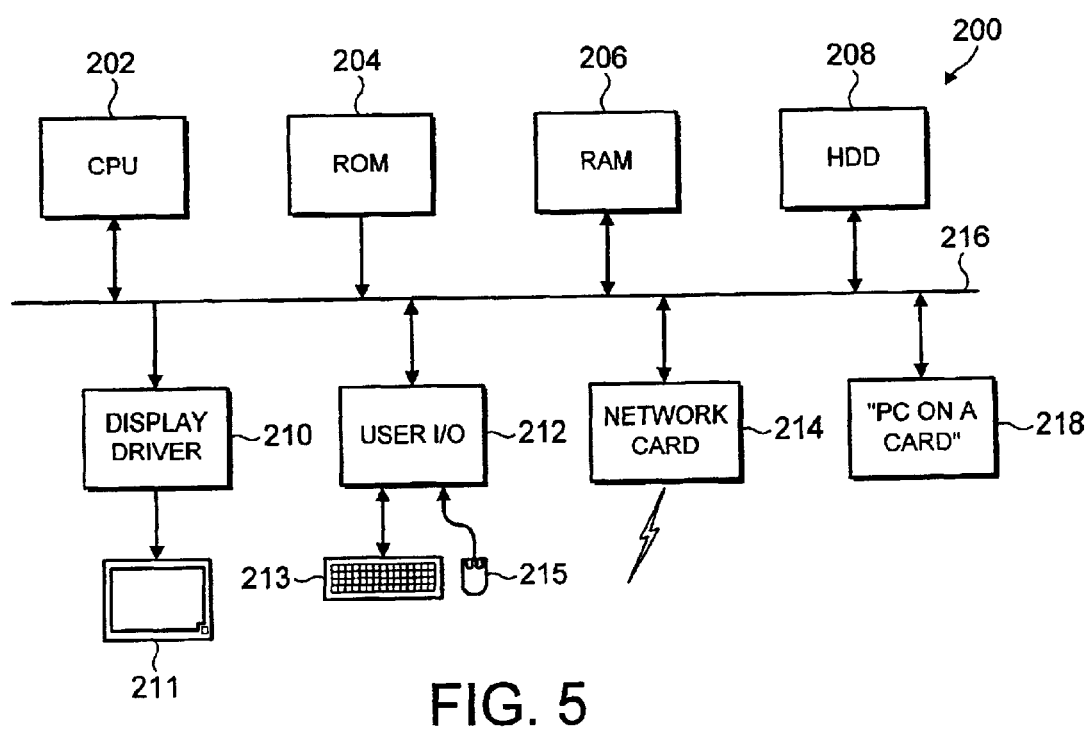
FIG. 5 shematically illustrates a general purpose computer of a type that may be used for performing scanning operations.

FIG. 5 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer-readable medium containing computer-readable instructions that when executed are operable to control a computer to scan a plurality of computer files for predefined properties, said computer program comprising:
   computer file request logic operable to control said computer to issue computer file requests for computer files to be scanned;
   scanning logic operable to control said computer to scan said requested computer files for predefined properties in dependence upon property defining data defining said predefined properties;
   update checking logic operable to control said computer to periodically check for an update request to update said property defining data;
   update applying logic operable to control said computer to stop said computer file requests and to update said property defining data in response to said update request, and, on completion of said update, to resume operation of said computer file request logic such that subsequently requested files are scanned against said updated property defining data;
   wherein, when all of said plurality of computer files have been requested, said computer file request logic is operable to request a first computer file again.

2. A computer program product as claimed in claim 1, wherein said update checking logic, is operable to check for an update after completion of each file scan.

3. A computer program product as claimed in claim 1, wherein said plurality of computer files, comprise all the computer files stored on said computer.

4. A computer program product as claimed in claim 1, wherein said plurality of computer files, comprise all the computer files stored on a hard disk of said computer.

5. A computer program product as claimed in claim 1, wherein said computer program comprises at least one priority code, said priority code determining an amount of said computer's resources to be allocated to said computer program.

6. A computer program product as claimed in claim 5, wherein said priority code is time dependent and comprises a high priority code during non-working periods and a low or zero priority code during normal working time.

7. A computer program product as claimed in claim 1, wherein said computer file request logic is operable to issue sequential computer file requests for computer files to be scanned.

8. A computer program product as claimed in claim 1, wherein said computer file request logic is operable, in response to an addition of computer files to said plurality of computer files, to issue a request for said newly added computer files.

9. A computer program product as claimed in claim 1, wherein said computer program comprises storage logic, said storage logic being operable to control said computer to store computer file identifying data identifying said last requested computer file.

10. A computer program product as claimed in claim 9, wherein on resumption of operation of said computer program following a stoppage, said computer file request logic is operable to check said requested computer file against said stored computer file identifying data and if said requested computer file is not a computer file subsequent to a computer file identified by said stored computer file identifying data to discard said computer file without implementing said scanning logic and to request a subsequent file.

11. A computer program product as claimed in claim 1, said computer program further comprising:
   stop condition checking logic operable to control said computer to periodically check for a stop condition and to end said computer file scan on detection of said stop condition.

12. A method of scanning a plurality of computer files for predefined properties, said method comprising the following steps:
   (i) issuing computer file requests for computer files to be scanned;
   (ii) scanning said requested computer files for predefined properties in dependence upon property defining data defining said predefined properties;
   (iii) periodically checking for update requests to update said property defining data;
   (iv) stopping said computer file requests and updating said property defining data in response to said update request;
   (v) on completion of said update, resuming issuing said computer file requests such that subsequently requested files are scanned against said updated property defining data;
   wherein, when all of said plurality of computer files have been requested, said computer file request logic is operable to request a first computer file again.

13. A method of scanning a plurality of computer files as claimed in claim 12, wherein said check for update requests is performed after each file is scanned.

14. A method of scanning a plurality of computer files as claimed in claim 12, wherein said plurality of computer files, comprise all the computer files stored on said computer.

15. A method of scanning a plurality of computer files as claimed in claim 12, wherein said plurality of computer files, comprise all the computer files stored on a hard disk of said computer.

16. A method of scanning a plurality of computer files as claimed in claim 12, wherein said method comprises at least one priority code associated with it, said priority code determining an amount of a computer resources to be allocated to performing said method at a particular time.

17. A method of scanning a plurality of computer files as claimed in claim 16, wherein said priority code is time dependent and comprises a high priority code during non-working periods and a low or zero priority code during normal working time.

18. A method of scanning a plurality of computer files as claimed in claim 12, wherein said computer file requests are issued sequentially.

19. A method of scanning a plurality of computer files as claimed in claim 12, said method comprising the further step of:
   in response to an addition of computer files to said plurality of computer files, issuing a request for said newly added computer files.

20. A method of scanning a plurality of computer files as claimed in claim 12, said method comprising the further step of:
   storing computer file identifying data identifying said requested computer file.

21. A method of scanning a plurality of computer files as claimed in claim 20, wherein on resumption of said scanning method following a stoppage, said method comprises the further step of checking said requested computer file against said stored computer file identifying data and if said requested computer file is not a computer file subsequent to a previously requested computer file identified by said stored computer file identifying data, discarding said computer file without performing said scanning step and requesting a subsequent file.

22. A method of scanning a plurality of computer files as claimed in claim 12, said method comprising the further step of:
   periodically checking for a stop condition and terminating said computer file scan on detection of said stop condition.

23. Apparatus for scanning a plurality of computer files for predefined properties, said apparatus comprising:
   computer file requester operable to issue computer file requests for computer files to be scanned;
   predetermined property scanner operable to scan said requested computer files for predefined properties in dependence upon property defining data defining said predefined properties;
   update request checker operable to periodically check for an update request to update said property defining data;
   update generator operable to stop said computer file requests and to update said property defining data in response to said update request, and, on completion of said update, to trigger resumption of operation of said computer file requester such that subsequently requested files are scanned against said updated property defining data;
   wherein, when all of said plurality of computer files have been requested, said computer file requester is operable to request a first computer file again.

24. Apparatus as claimed in claim 23, wherein said update request checker is operable to check for an update after completion of each file scan.

25. An apparatus as claimed in claim 23, wherein said plurality of computer files, comprise all the computer files stored on a computer.

26. An apparatus as claimed in claim 23, wherein said plurality of computer files, comprise all the computer files stored on a hard disk of a computer.

27. An apparatus as claimed in claim 23, wherein said apparatus is responsive to priority codes, such that an amount of said apparatus's resources allocated to scanning said plurality of computer files is determined by a priority code associated with said scan.

28. An apparatus as claimed in claim 27, wherein said priority codes are time dependent, high priority codes being given to said scan during non-working periods and a low or zero priority code being given during normal working time.

29. An apparatus as claimed in claim 23, wherein said computer file requester is operable to issue sequential computer file requests for computer files to be scanned.

30. An apparatus as claimed in claim 23, wherein said computer file requester is operable, in response to an addition of computer files to said plurality of computer files, to issue a request for said newly added computer files.

31. An apparatus as claimed in claim 23, said apparatus further comprising a store, said store being operable to store computer file identifying data identifying said requested computer file.

32. An apparatus as claimed in claim 31, wherein on resumption of operation of said apparatus following a stoppage, said computer file requester is operable to check said requested computer file against said stored computer file identifying data and if said requested computer file is not a computer file subsequent to a previously requested computer file identified by said stored computer file identifying data to discard said computer file without implementing said predetermined property scanner and to request a subsequent file.

33. An apparatus as claimed in claim 23, said apparatus further comprising:
 a stop condition checker operable to control said apparatus to periodically check for a stop condition and to terminate said computer file scan on detection of said stop condition.

* * * * *